US007724500B2

(12) United States Patent
Long et al.

(10) Patent No.: US 7,724,500 B2
(45) Date of Patent: May 25, 2010

(54) NANOSCALE MANGANESE OXIDE ON ULTRAPOROUS CARBON NANOARCHITECTURE

(75) Inventors: Jeffrey W. Long, Alexandria, VA (US); Anne E. Fischer, Arlington, VA (US); Debra R. Rolison, Arlington, VA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 181 days.

(21) Appl. No.: 11/826,362

(22) Filed: Jul. 13, 2007

(65) Prior Publication Data

US 2008/0247118 A1 Oct. 9, 2008

Related U.S. Application Data

(60) Provisional application No. 60/847,399, filed on Sep. 11, 2006.

(51) Int. Cl.
*H01G 9/00* (2006.01)
*H01G 9/04* (2006.01)

(52) U.S. Cl. ........................... 361/502; 361/508

(58) Field of Classification Search ................. 361/502, 361/508
See application file for complete search history.

(56) References Cited

U.S. PATENT DOCUMENTS

| 5,455,999 A | * | 10/1995 | Weiss et al. ................ 29/623.1 |
| 6,013,208 A | * | 1/2000 | Nakamura et al. ......... 264/29.4 |
| 2004/0038090 A1 | * | 2/2004 | Faris .......................... 429/12 |

OTHER PUBLICATIONS

Dong et al., "A Structure of MnO2 embedded in CMK-3 framework developed by a redox method", Microporous and Mesoporous Materials, 91, (2006), pp. 120-127.*

* cited by examiner

*Primary Examiner*—Eric Thomas
(74) *Attorney, Agent, or Firm*—Amy L. Ressing

(57) ABSTRACT

A composite concerning a porous carbon structure having a surface and pores and a coating of $MnO_2$ on the carbon surface, wherein the coating does not completely fill or obstruct a majority of the pores, and wherein the coating is formed by self-limiting electroless deposition.

12 Claims, 7 Drawing Sheets

NANOSCALE MANGANESE OXIDE ON ULTRAPOROUS CARBON NANOARCHITECTURE

This application claims the benefit of provisional application No. 60/847,399 filed on Sep. 11, 2006.

Electrochemical capacitors (also denoted as supercapacitors or ultracapacitors) are a class of energy-storage materials that offer significant promise in bridging the performance gap between the high energy density of batteries and the high power density derived from dielectric capacitors. Energy storage in an electrochemical capacitor is accomplished by two principal mechanisms: double-layer capacitance and pseudocapacitance.

Double-layer capacitance arises from the separation of charge that occurs at an electrified interface. With this mechanism the capacitance is related to the active electrode surface area, with practical capacitances in liquid electrolytes of 10-40 µF cm$^{-2}$. Electrochemical capacitors based on double-layer capacitance are typically designed with high-surface-area carbon electrodes, including carbon aerogels, foams, nanotube/nanofiber assemblies, and papers. Carbon aerogels and related porous carbons are particularly attractive due to their high surface areas, high porosities, and excellent conductivities (>40 S cm$^{-1}$). Although the high-quality porosity of such carbon nanoarchitectures supports rapid charge-discharge operation, the overall energy-storage capacities of carbon electrodes are ultimately limited by their reliance on the double-layer capacitance mechanism.

Pseudocapacitance broadly describes faradaic reactions whose current-voltage profiles mimic those of double-layer capacitors. Because this mechanism involves true electron-transfer reactions and is not strictly limited to the electrode surface, materials exhibiting pseudocapacitance often have higher energy densities relative to double-layer capacitors. The two main classes of materials being researched for their pseudocapacitance are transition metal oxides and conducting polymers.

At present, some of the best candidates for electrochemical capacitors are based on nanoscale forms of mixed ion-electron conducting metal oxides, such as RuO$_2$, which store charge via a cation-electron insertion mechanism.

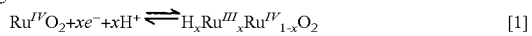

$$\text{Ru}^{IV}\text{O}_2 + xe^- + x\text{H}^+ \rightleftharpoons \text{H}_x\text{Ru}^{III}_x\text{Ru}^{IV}_{1-x}\text{O}_2 \qquad [1]$$

Electrodes based on disordered, hydrous RuO$_2$ yield specific capacitances up to 720 F g$^{-1}$. However, the application of RuO$_2$ is limited by the high costs of the ruthenium precursors.

Manganese oxides have recently gained attention as active materials for electrochemical capacitors, primarily due to their significantly lower cost relative to hydrous RuO$_2$. A survey of recent publications, combined with research findings at the NRL, shows that when prepared in traditional electrode configurations, such as micron-thick films or in composite electrodes containing carbon and binders, MnO$_2$ delivers a specific capacitance of ~200 F g$^{-1}$, which is competitive with carbon supercapacitors, but far short of the 720 F g$^{-1}$ obtained with hydrous RuO$_2$. However, as reported independently by Pang et al. and Toupin et al., when MnO$_2$ is produced as a very thin film (tens of nanometers or less) on a planar current collector, specific capacitances of 700 F g$^{-1}$ and 1380 F g$^{-1}$ can be achieved, respectively. This disparity in measured capacitance can be attributed to poor long-range electronic and/or ionic conductivity for MnO$_2$, which can inhibit the charge-discharge process in conventional electrode designs. Although ultrathin films of MnO$_2$ deliver high specific capacitance, this configuration can limit the area-normalized capacitance for practical EC devices.

Alternatives involve electrode structures incorporating carbon nanotubes (an expensive carbon substrate) or alternative MnO$_2$ deposition methods (e.g., electrodeposition, sputtering), which are more complicated, costly and more difficult to control.

DESCRIPTION

Nanostructured MnO$_2$-carbon nanoarchitecture hybrids can be designed as electrode structures for high-energy-density electrochemical capacitors that retain high power density. Homogeneous, ultrathin coatings of nanoscale MnO$_2$ can be incorporated within porous, high-surface-area carbon substrates (such as carbon nanofoams) via electroless deposition from aqueous permanganate under controlled pH conditions. The resulting hybrid structures exhibit enhanced gravimetric, volumetric, and area-normalized capacitance when electrochemically cycled in aqueous electrolytes. This design can be extended to other mesoporous and macroporous carbon forms possessing a continuous pore network.

Figure 1:
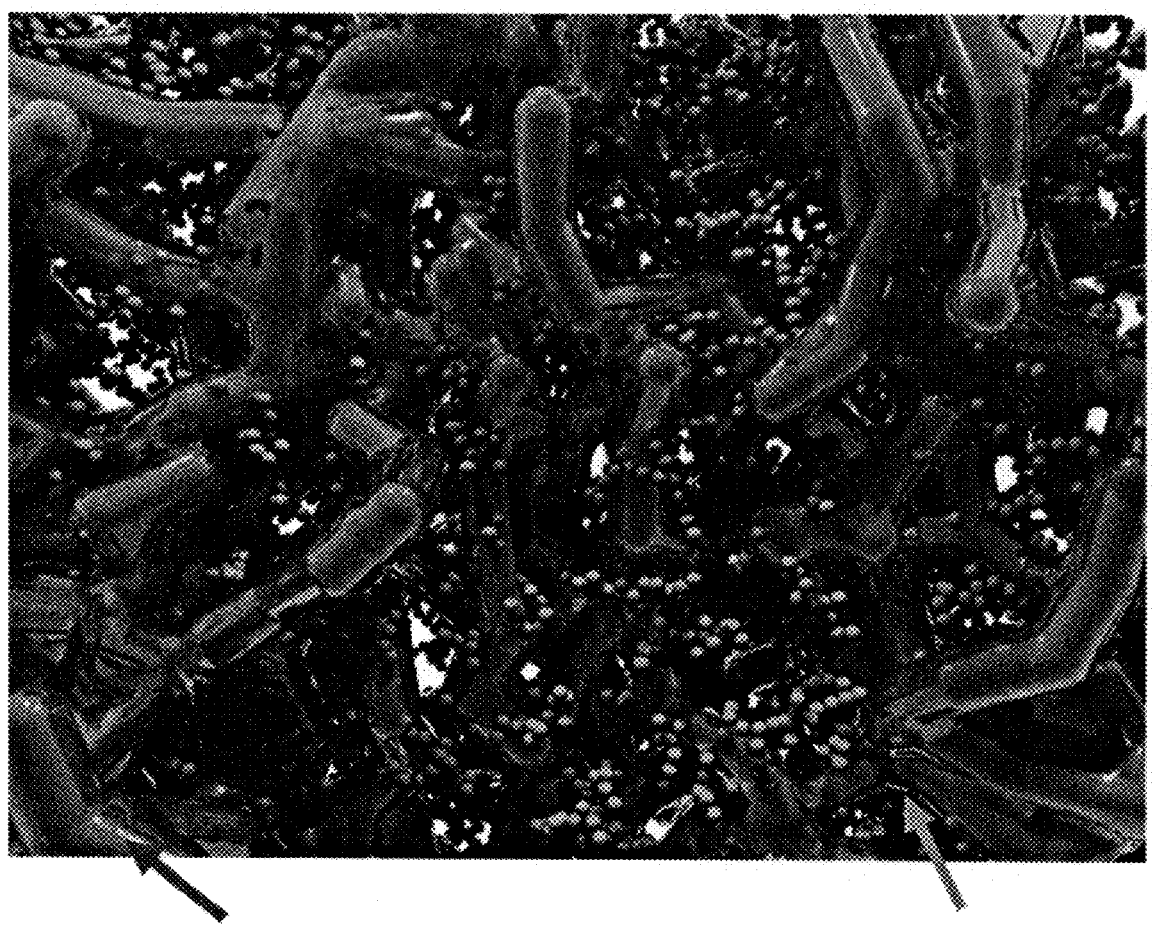
FIG. 1 shows a schematic of a hybrid electrode structure comprising a highly porous carbon nanostructure coated with nanoscopic MnO$_2$ deposits.

The performance limitations of MnO$_2$ for electrochemical capacitors can be addressed with a hybrid electrode design, by incorporating discrete nanoscale coatings or deposits of MnO$_2$ onto porous, high-surface-area carbon structures (see FIG. 1). In such a configuration, long-range electronic conduction is facilitated through the carbon backbone and solid-state transport distances for ions through the MnO$_2$ phase can be minimized by maintaining a nanoscopic carbon ‖MnO$_2$‖ electrolyte interface throughout the macroscopic porous electrode. Such a design can be realized using various types of porous carbon substrates including but not limited to aerogels/nanofoams, templated mesoporous carbon, and nanotube/nanofiber assemblies.

The synthesis and electrochemical characterization of MnO$_2$-carbon composites has been reported and primarily focused on incorporating nanoscale MnO$_2$ deposits onto carbon nanotubes using a variety of approaches including simple physical mixing of the components, chemical deposition using such precursors as $KMnO_4$, and electrochemical deposition. In these cases, the incorporation of $MnO_2$ improves the capacitance of the electrode structures that contain the $MnO_2$-modified carbon nanotubes; however, the overall specific capacitance for the composite structures is typically limited to <200 F $g^{-1}$, even for electrodes with high weight loadings of $MnO_2$. One exception was reported by Lee et al., who demonstrated specific capacitances of up to 415 F $g^{-1}$ as normalized to the $MnO_2$ of the composite structure. However, those results were achieved only for micron-thick electrode structures containing $MnO_2$-modified carbon nanotubes, again a configuration that limits energy density.

Templated mesoporous carbon powders have also been used as a substrate for $MnO_2$ deposition as demonstrated by Dong et al., who used the reaction of permanganate with the carbon substrate to generate nanoscale $MnO_2$ deposits directly on the mesopore walls. Electrochemical testing of the resulting $MnO_2$-mesoporous carbon structures revealed that the $MnO_2$ deposits themselves exhibited a specific capacitance of ~600 F $g^{-1}$, which approaches the 700 F $g^{-1}$ reported by Pang et al. for nanometers-thick $MnO_2$ films. Despite the high $MnO_2$-normalized capacitance, the overall specific capacitance of the hybrid $MnO_2$-mesoporous carbon structure was limited to 200 F $g^{-1}$, due to the relatively low weight loading (up to 26%) of $MnO_2$. The extent of $MnO_2$ deposition within the mesoporous carbon substrate can be limited by the inherently small pore size (~3 nm) of the carbon.

The investigations of Dong et al. and Lee et al. demonstrate that nanoscopic deposits of $MnO_2$ on high-surface-area substrates do deliver high specific capacitance. To further optimize the performance of $MnO_2$-carbon hybrid structures for electrochemical capacitor applications, at least three design parameters must be addressed: (i) achieving high weight loadings of $MnO_2$ (>50 wt. %); (ii) fabricating electrode structures with macroscopic thickness (tens to hundreds of microns); and (iii) retaining a through-connected pore network in 3D and with pores sized at >5 nm.

Figure 2:
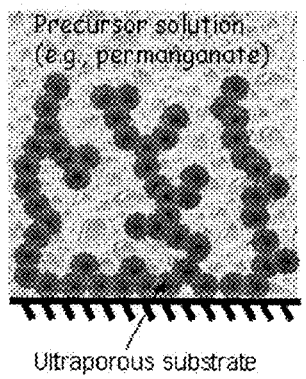
FIG. 2 shows a schematic of electrodeposition on an ultraporous electrode structure in (i) a poorly controlled manner in which the pores are ultimately blocked by the growing film and (ii) a controlled, self-limiting deposition.
Figure 2:
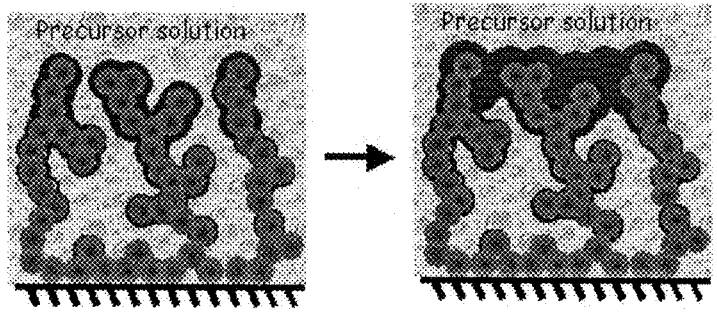
Figure 2:
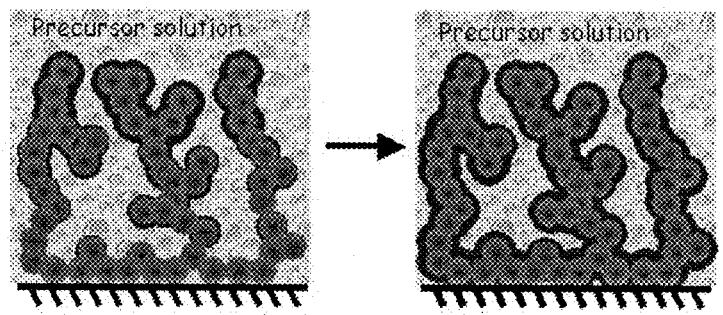

The use of thick carbon substrates, as opposed to dispersed carbon powders, presents new challenges for achieving homogeneous $MnO_2$ deposition throughout the electrode structure, while preserving the native pore structure of the carbon template. A high-quality pore structure is vital for high-rate EC operation, facilitating electrolyte infiltration and ion transport. These properties can be achieved by using coating methods that are inherently self-limiting as shown schematically in FIG. 2. Described in this disclosure is the self-limiting electroless deposition of nanoscale $MnO_2$, based on the redox reaction of aqueous permanganate ($MnO_4^-$) and carbon aerogel/nanofoam substrates. The $MnO_2$ prepared by this protocol is a complex structure incorporating cations and water; this material will be designated as $MnO_2$ in the body of this application.

EXAMPLE 1

Electroless Deposition of $MnO_2$ on Carbon Nanofoams

Carbon nanofoam papers were either purchased from a commercial source or prepared in-house. $MnO_2$-carbon nanoarchitecture hybrids were created based on the reductive decomposition of permanganate from aqueous solutions. The carbon nanoarchitecture surface can serve as a sacrificial reductant, converting the aqueous permanganate to insoluble $MnO_2$.

Carbon nanofoam substrates (~170 µm thick) were first wetted in an aqueous solution of controlled pH (0.1 M $H_2SO_4$, 0.1 M $Na_2SO_4$, or 0.1 M NaOH) by vacuum infiltration. The samples were then soaked in 0.1 M $NaMnO_4$ at each respective pH for a period of 5 min to 4 h. The $MnO_2$-carbon nanofoam papers were rinsed thoroughly with ultrapure water and subsequently dried at ~50° C. under $N_2$ for 8 hours and then under vacuum overnight.

Control of the permanganate reduction reaction can be required to achieve nanoscale $MnO_2$ deposits throughout the carbon nanoarchitecture as well as to inhibit the formation of thick $MnO_2$ coatings on the outer boundary of the carbon electrode. Preliminary results suggest that pH can be a critical factor in determining the quality of the $MnO_2$ deposition.

Figure 3:
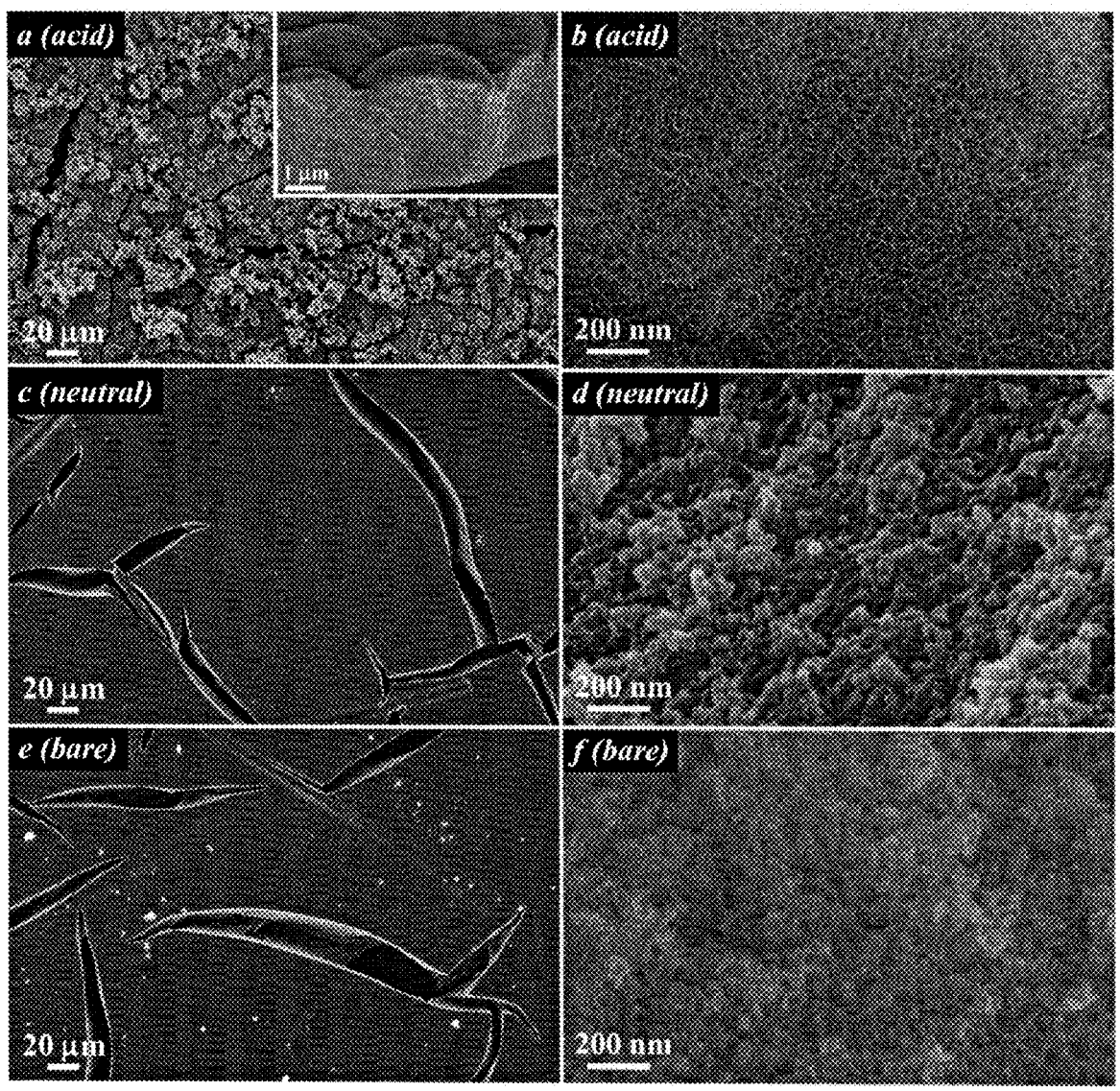
FIG. 3 shows scanning electron micrographs of (a and b) 4-h acid-deposited MnO$_2$-carbon, (c and d) 4-h neutral-deposited MnO$_2$-carbon, and (e and f) bare carbon nanofoam.

As shown by the scanning electron micrographs (SEM) in FIGS. 3a and 3b, under acidic conditions, permanganate reacts with carbon nanofoams to primarily form thick crusts of $MnO_2$ on the outer boundary of the carbon electrode, presumably due to the autocatalytic decomposition of permanganate in acid. A cross-sectional image of the acid-deposited $MnO_2$ crust, shown in the inset of FIG. 3a, reveals that the crust thickness was ~4 µm for a 4-h deposition. By contrast, permanganate reduction in neutral or basic pH solutions results in homogeneous $MnO_2$ deposits (neutral sample, FIGS. 3c and 3d) that are nearly indistinguishable from the bare carbon aerogel (FIGS. 3e and 3f) with no $MnO_2$ crust formation at the outer boundary of the nanofoam electrode.

The $MnO_2$ mass uptake (up to ~60% for a 24-h deposition) can be relatively independent of the solution pH. The SEM analysis further confirmed that the porous texture of the initial carbon nanofoam can be largely retained following $MnO_2$ deposition (see FIGS. 3d and 3f). The retention of the nanofoam's high-quality pore structure can result in better electrochemical performance under high-rate charge-discharge operation.

Figure 4:
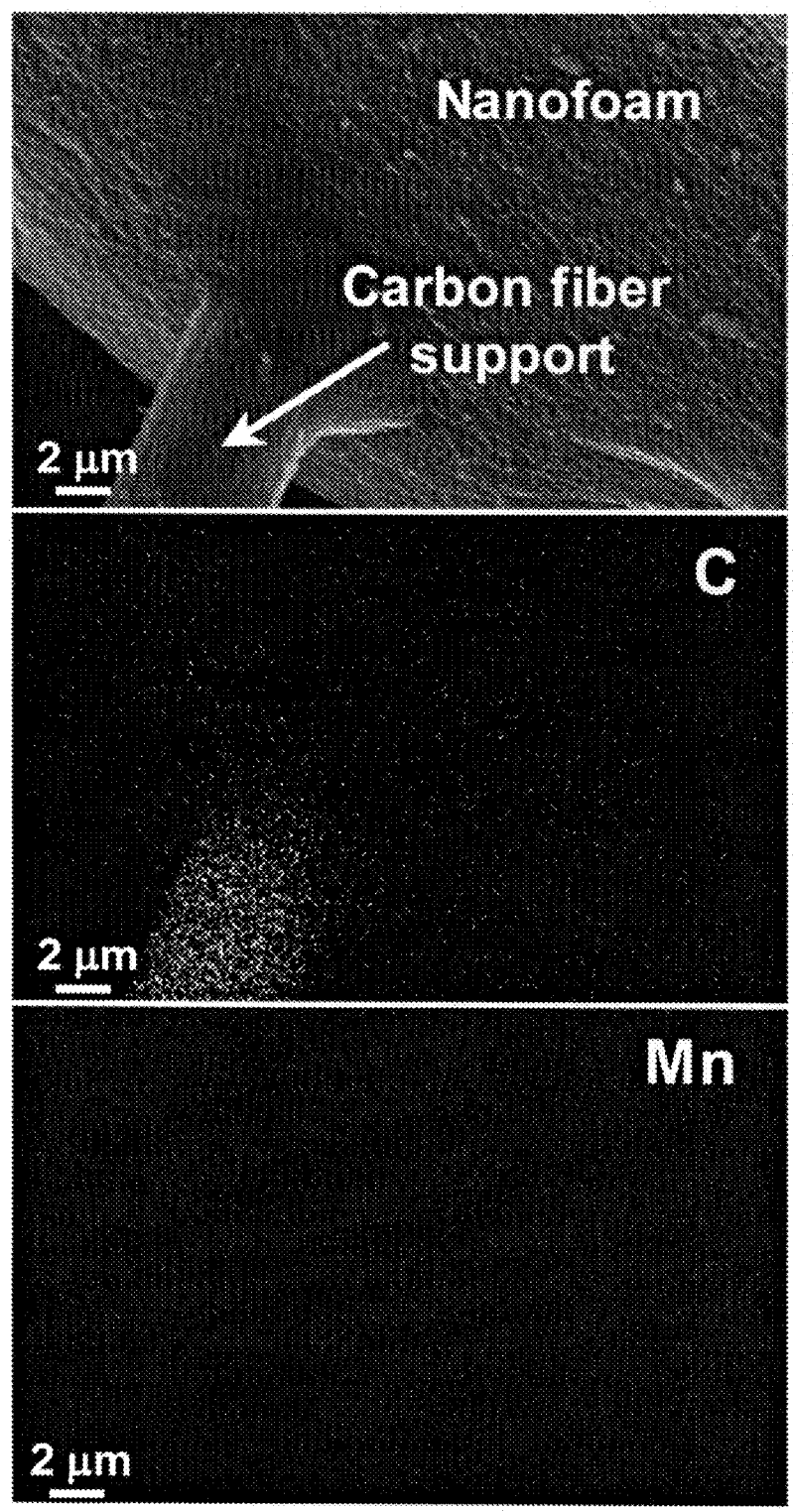
FIG. 4 shows a scanning electron micrograph (top) for the cross-section of a 4-h neutral-deposited MnO$_2$-carbon, and corresponding elemental mapping images (middle and bottom) of this same area of the sample for carbon and manganese content, respectively.

The cross-sectional SEM and elemental mapping images of the $MnO_2$-carbon nanofoam synthesized under neutral conditions in FIG. 4 show that the Mn can be evenly distributed throughout the thickness of the electrode structure. Incorporation of the $MnO_2$ domains within the porous carbon nanoarchitectures in such a homogeneous, conformal fashion can result in hybrid electrode structures with superior performance relative to the less ideal structures obtained under acidic deposition conditions. X-ray photoelectron spectroscopy was used to verify that Mn deposits were primarily in the form of $Mn^{III/IV}O_2$, with no residual $MnO_4^-$.

EXAMPLE 2

Electrochemical Characterization of Hybrid Structures

Figure 5:
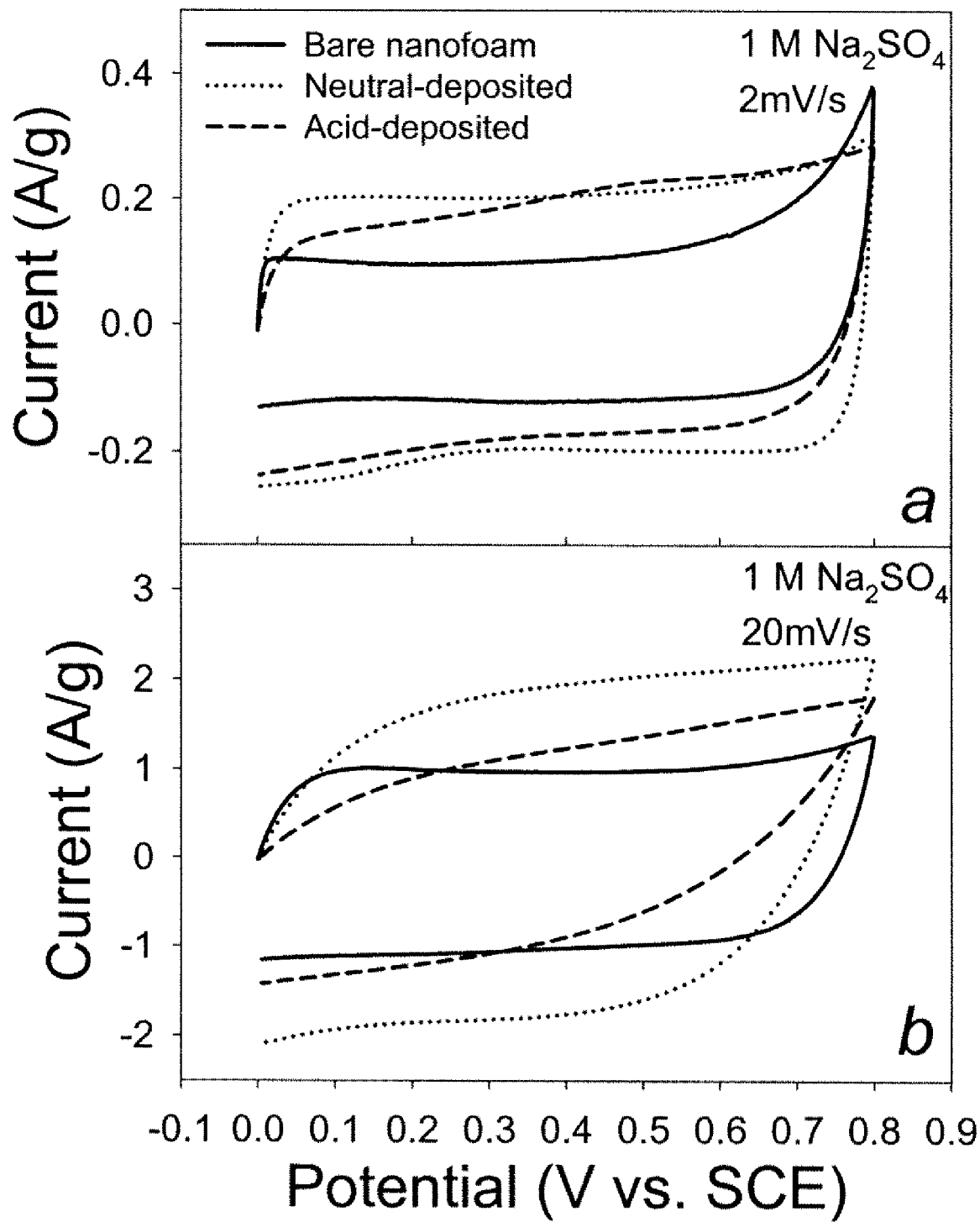
FIG. 5 shows cyclic voltammograms at 2 and 20 mV s$^{-1}$ in 1 M Na$_2$SO$_4$ for bare carbon nanofoam (-) and 4-h MnO$_2$-carbon nanofoam deposited from acidic permanganate solution ( - - - ) and neutral permanganate solution ( . . . ).

The $MnO_2$-carbon nanofoam electrodes were wetted with 1 M $Na_2SO_4$ under vacuum for electrochemical analysis and characterized in a conventional three-electrode electrochemical cell using techniques such as cyclic voltammetry, impedance spectroscopy, and galvanostatic charge-discharge measurements. Representative cyclic voltammograms of the bare carbon aerogel, 4-h acid-deposited, and 4-h neutral-deposited $MnO_2$-carbon nanofoam electrodes in 1 M $Na_2SO_4$ at 2 and 20 mV $s^{-1}$ are presented in FIG. 5.

A saturated calomel reference electrode (SCE) and reticulated vitreous carbon auxiliary electrode were used in all electrochemical measurements. At 2 mV $s^{-1}$, all curves exhibit a nearly symmetrical rectangular shape, indicative of relatively low uncompensated electrode or solution resistance. The gravimetric (normalized to total sample mass), volumetric, and area-normalized capacitance values calculated from these curves between 0.1 and 0.6 V vs. SCE are presented in Table 1. Both the total gravimetric and volumetric capacitance values increase for the acid and neutral-deposited samples. Notably, the gravimetric capacitance increases by a factor of 2 for the neutral-deposited sample, while the volumetric capacitance is over 4 times greater. It is important to note that in the case of homogeneous, nanoscopic $MnO_2$ deposits like those in the neutral-deposited hybrid electrode, the incorporation of $MnO_2$ can contribute additional capacitance without increasing the bulk volume of the electrode structure.

When pulse power is required in a footprint- or area-limited configuration, as in microelectromechanical (MEMS) based and on-chip devices, the area-normalized energy-storage capacity should also be considered. Although the area-normalized capacitance is often not reported for $MnO_2$/carbon composites, it is usually around 10-50 mF $cm^{-2}$. In contrast, the present hybrid electrode design maintains the advantages of a nanoscopic electrode/electrolyte interface while projecting the electrode structure in three dimensions with a limited footprint, such that the area-normalized capacitance for the neutral-deposited $MnO_2$-carbon hybrid electrodes is orders of magnitude greater at $\geq 2$ F $cm^{-2}$.

The upper and lower limits of capacitance attributed to $MnO_2$ in Table 1 were estimated using one of two assumptions: (1) all capacitance arises from the $MnO_2$ phase (upper limit) or (2) the total sample capacitance was the sum of the carbon double-layer capacitance and the $MnO_2$ capacitance (lower limit). Although the capacitance attributable to the $MnO_2$ phase for the acid- and neutral-deposited samples likely falls within this range, the capacitance contribution from the carbon is expected to be different for the acid and neutral case because of the variation in the $MnO_2$ spatial distribution. For example in the acid case, the double-layer capacitance contribution of carbon should be largely unaffected due to the limited $MnO_2$ deposition in the electrode interior. Thus, the $MnO_2$-normalized capacitance is likely near the lower estimated limit, while that for the neutral sample is expected to be higher as a result of extensive $MnO_2$ coating the carbon on the electrode interior.

Figure 6:
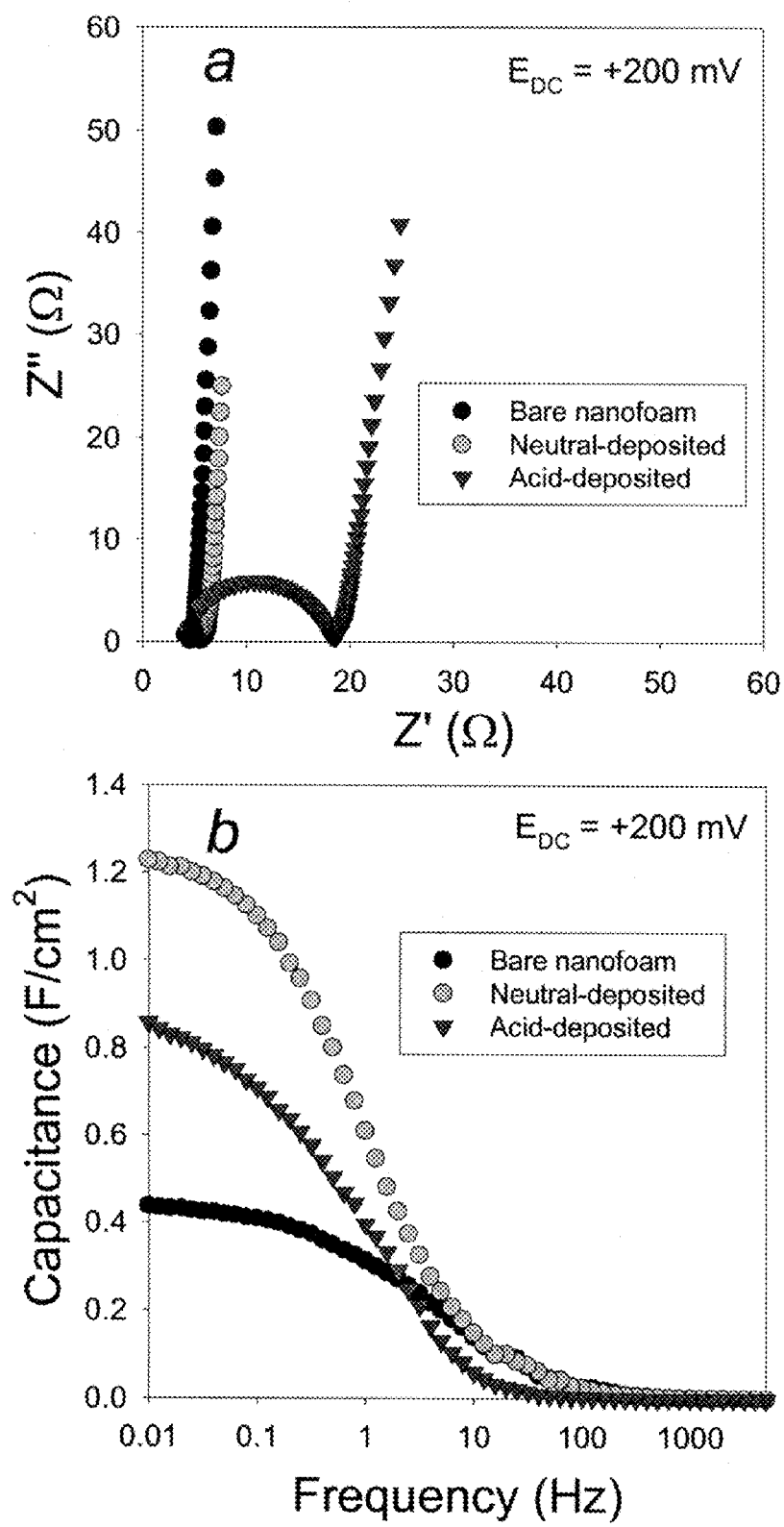
FIG. 6 shows a Nyquist plot and a capacitance vs. frequency profile for acid-deposited, neutral-deposited MnO$_2$-carbon nanofoam and bare carbon nanofoam.

Although the total capacitance enhancement for the acid and neutral-deposited $MnO_2$ samples presented in Table 1 is similar, the difference in the spatial distribution of $MnO_2$ for the two samples results in a sloping voltammetric curve for the boundary-crusted, acid-deposited $MnO_2$-carbon nanofoam at 20 mV $s^{-1}$ due to increasing resistance that results from non-uniform $MnO_2$ deposition. This increased resistance is confirmed by electrochemical impedance analysis ($E_{DC}$=200 mV vs. SCE) presented in FIG. 6 (similar results were observed at 0 and 600 mV).

At high frequencies, the uncompensated solution resistance ($R_\Omega$) of each electrode is similar, as shown in the Nyquist plot (FIG. 6a). However, the large hemispherical component for the $MnO_2$-carbon nanofoam electrode deposited under acidic conditions is indicative of polarization as expressed by a charge-transfer resistance ($R_p$) of about 15Ω. In contrast, the profile for the neutral-deposited sample is more similar to that of the bare carbon nanofoam, with an $R_p$ of ~1Ω. The capacitance vs. frequency profile of the neutral-deposited sample in FIG. 6b shows that from about 0.01 to 1 Hz, the $MnO_2$ component can increase the capacitance of the bare carbon nanofoam. As the frequency increases, the capacitance for both electrodes begins to decrease, falling to below 1 F $g^{-1}$ around 200 Hz. The initial capacitance increase for the acid-deposited sample at 0.01 Hz, with respect to the bare nanofoam, can be much lower than that for the neutral-deposited sample and begins to decrease between 0.1 and 1 Hz, falling below 1 F $g^{-1}$ at 30 Hz.

The higher resistance and lower capacitance for the acid-deposited sample is likely due to the thick $MnO_2$ crust that forms on the electrode exterior, hindering electron and ion transport, while the more ideal homogeneous distribution of $MnO_2$ in the sample deposited under neutral conditions results in electrochemical characteristics more similar to the bare nanofoam.

TABLE 1

|  | Specific capacitance (F $g^{-1}_{C+MnO_2}$) | $MnO_2$-specific capacitance range (F $g^{-1}_{MnO_2}$) | Volumetric capacitance (F $cm^{-3}$) | Area-normalized capacitance (F $cm^{-2}$)** |
|---|---|---|---|---|
| Bare nanofoam* | 53 | — | 20 | 0.56 |
| Acid-deposited* | 92 | 150-220 | 81 | 1.4 |
| Neutral-deposited* | 110 | 170-230 | 90 | 1.5 |

*These data are derived for 4-h depositions from acidic or neutral permanganate solutions.
**Normalized to the geometric area of one face of the nanofoam electrode.

The electroless deposition described herein can be a simple, cost-effective, and scaleable approach for synthesizing $MnO_2$-carbon hybrid nanoarchitectures with electrochemical capacitance that is superior to unmodified carbon substrates. This disclosure demonstrates that by controlling solution pH during the deposition process, homogeneous $MnO_2$ deposits are achieved throughout macroscopically thick porous carbon templates.

There can be many benefits of homogenous $MnO_2$ deposition as can be evident when such structures are electrochemically analyzed. For example, $MnO_2$-carbon hybrids that exhibit uniform $MnO_2$ distribution (neutral-pH deposition) also exhibit higher overall gravimetric and volumetric capacitance, and higher $MnO_2$-specific capacitance than acid-deposited $MnO_2$-carbon hybrids, in which the $MnO_2$ is primarily deposited as a crust on the outer boundaries of the electrode.

Uniform deposition within the interior of the carbon nanoarchitecture also can result in greater enhancement when the volumetric capacitance is considered, as the addition of the $MnO_2$ component contributes additional capacitance without increasing the bulk volume of the electrode structure. For example, with a carbon nanofoam coated under neutral-pH conditions the gravimetric capacitance is increased by a factor of 3.3, while the volumetric capacitance is increased by a factor of 4.1. Even greater enhancements in electrochemical performance for these hybrids can be realized with further optimization of the electroless deposition conditions (e.g., varying the solution temperature, precursor concentration, permanganate counterion—including transition metal speciation, constituents that define the acidic or neutral medium including buffers) and also by varying the carbon template pore structure, particularly targeting larger pore sizes (100-200 nm) and higher overall porosity, which should result in higher mass loadings of $MnO_2$.

Figure 7:
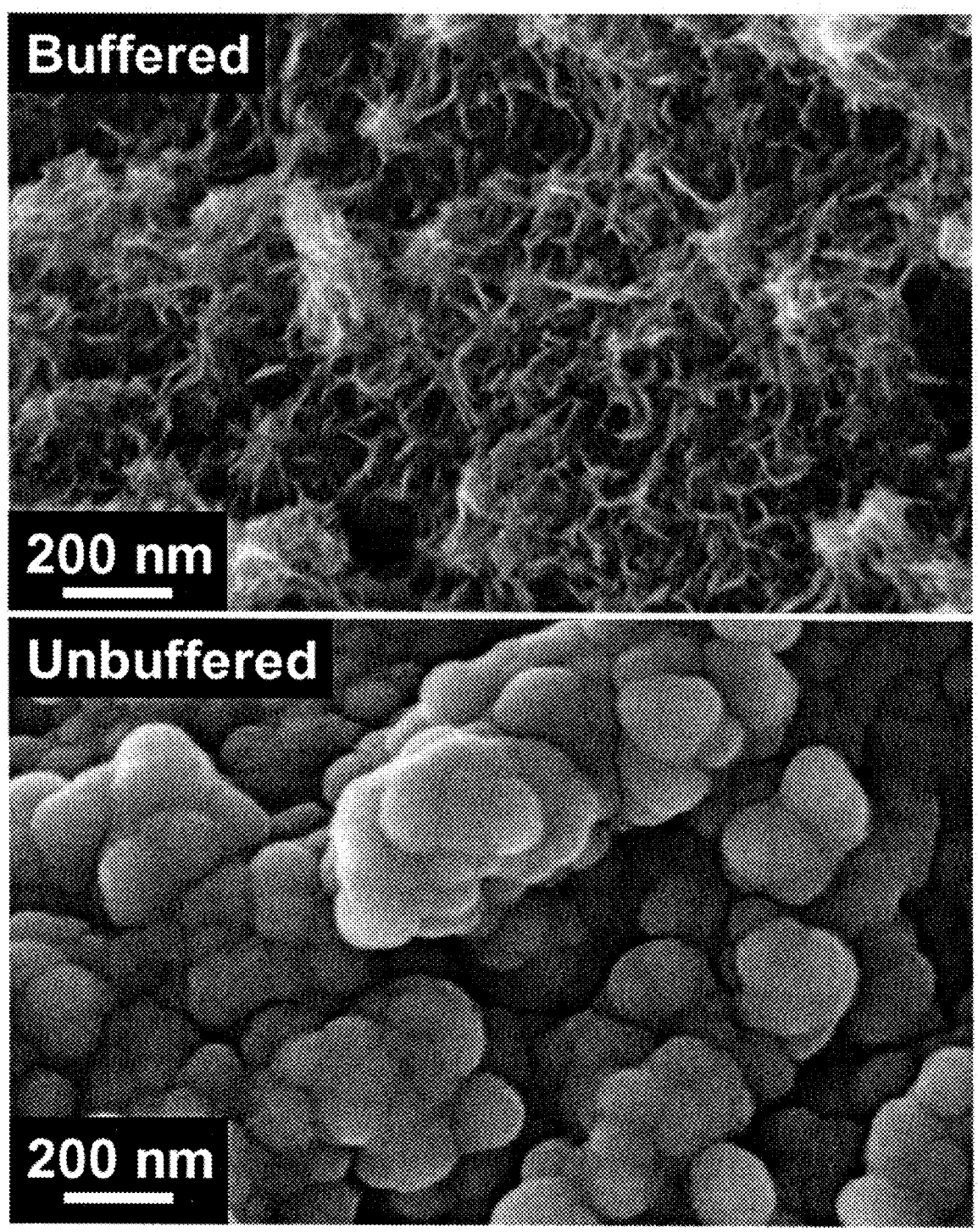
FIG. 7 shows scanning electron micrographs of the surfaces of 4-h neutral-deposited MnO$_2$-carbon nanofoams, where AgMnO$_4$ is the deposition precursor, both with (top) and without (bottom) the addition of a pH 6.9 phosphate buffer.

In an example of two modifications to the deposition protocol, carbon nanofoams were soaked in nominally neutral aqueous solutions of commercially available $AgMnO_4$ (substituted for $NaMnO_4$) under buffered and unbuffered conditions. The morphology of the resulting $Ag_xMn^{III/IV}_{1-x}O_2$ deposits is affected by the presence or absence of buffering agents. Without buffer, the oxide coating is more nodular and preferentially deposited on the outer boundary, while from buffered medium, the deposit is more uniformly distributed, not nodular, and less thick (as seen in FIG. 7).

Obviously, many modifications and variations of the present invention are possible in light of the above teachings. It is therefore to be understood that the claimed invention may be practiced otherwise than as specifically described. Any reference to claim elements in the singular, e.g., using the articles "a," "an," "the," or "said" is not construed as limiting the element to the singular.

What is claimed is:

1. A composite comprising a porous carbon structure comprising a surface and pores wherein the pores have an average diameter of from about 2 nm to about 1 µm; and
    a coating of $MnO_2$ on the carbon surface;
    wherein the coating does not completely fill or obstruct a majority of the pores;
    wherein the coating is formed by self-limiting electroless deposition;
    wherein the porous carbon structure is a carbon aerogel; and
    wherein cations and water are incorporated within the $MnO_2$.

2. The composite of claim 1, wherein the coating has a thickness of less than about 50 nm.

3. The composite of claim 1, wherein the coating has a thickness of less than about 10 nm.

4. A capacitor comprising an anode, a cathode, and an electrolyte, wherein the anode, the cathode, or both comprise:
    a composite comprising a porous carbon structure comprising a surface and pores; and
    a coating on the surface comprising $MnO_2$ wherein cations and water are incorporated within the $MnO_2$;
    wherein the coating does not completely fill or obstruct a majority of the pores;
    wherein the porous carbon structure is a carbon aerogel; and
    wherein the pores have an average diameter that ranges from about 2 nm to about 1 µm; and
    a current collector in electrical contact with the composite.

5. The capacitor of claim 4, wherein the coating has a thickness of less than about 50 nm.

6. The capacitor of claim 4, wherein the coating has a thickness of less than about 10 nm.

7. The capacitor of claim 4, wherein the electrolyte comprises aqueous sodium sulfate.

8. The capacitor of claim 4, wherein the electrolyte comprises a liquid comprising an aqueous, nominally neutral (pH 6-8) electrolyte with or without buffering components.

9. The capacitor of claim 4, wherein the electrolyte comprises a liquid comprising an aqueous, basic (pH>8) electrolyte with or without buffering components.

10. The capacitor of claim 4, wherein the electrolyte comprises a liquid comprising a nonaqueous liquid of sufficient dielectric constant to dissociate salts soluble in the nonaqueous liquid.

11. The capacitor of claim 4, wherein the coating is formed by self-limiting electroless deposition.

12. A capacitor comprising an anode, a cathode, and an electrolyte, wherein the anode, the cathode, or both comprise:
    a composite comprising a nanostructured porous carbon structure comprising a surface and interpenetrating continuous network of pores; and
    a coating on the surface comprising $MnO_2$ wherein the $MnO_2$ coating is homogenous and evenly distributed throughout and has a thickness of less than about 10 nm;
    wherein the coating does not completely fill or obstruct a majority of the pores;
    wherein the porous carbon structure is a carbon aerogel;
    wherein the pores have an average diameter that ranges from about 2 nm to about 1 µm;
    wherein the interpenetrating continuous network of pores is retained; and
    a current collector in electrical contact with the composite.

* * * * *